(12) United States Patent
Dugan

(10) Patent No.: US 9,611,967 B2
(45) Date of Patent: Apr. 4, 2017

(54) INTERNALLY HEATED FLUID TRANSFER PIPES WITH INTERNAL HELICAL HEATING RIBS

(71) Applicant: Joseph Dugan, Canonsburg, PA (US)

(72) Inventor: Joseph Dugan, Canonsburg, PA (US)

(*) Notice: Subject to any disclaimer, the term of this patent is extended or adjusted under 35 U.S.C. 154(b) by 99 days.

(21) Appl. No.: 13/743,424

(22) Filed: Jan. 17, 2013

(65) Prior Publication Data

US 2013/0186498 A1 Jul. 25, 2013

Related U.S. Application Data

(60) Provisional application No. 61/588,468, filed on Jan. 19, 2012.

(51) Int. Cl.
*E03B 7/10* (2006.01)
*F16L 53/00* (2006.01)
*F16L 9/18* (2006.01)

(52) U.S. Cl.
CPC .............. *F16L 53/001* (2013.01); *F16L 9/18* (2013.01); *F16L 53/002* (2013.01)

(58) Field of Classification Search
CPC ....... F16L 53/002; F16L 53/001; F16L 47/02; F28F 11/00; F28D 7/024
USPC ................. 138/38, 32–35; 165/156, 184, 185
See application file for complete search history.

(56) References Cited

U.S. PATENT DOCUMENTS

| | | | |
|---|---|---|---|
| 1,132,757 A | 3/1915 | Ashton | |
| 1,740,300 A | 12/1929 | Henszey | |
| 1,791,531 A | 2/1931 | Morrow | |
| 2,259,433 A | 10/1941 | Kitto | |
| 2,471,317 A | 5/1949 | Fausek et al. | |
| 2,930,405 A | 3/1960 | Welsh | |
| 3,103,946 A | 9/1963 | Troxell | |
| 3,138,201 A * | 6/1964 | Hue ............................... | 165/163 |
| 3,566,615 A * | 3/1971 | Roeder, Jr. ....................... | 62/511 |
| 3,719,207 A | 3/1973 | Takeda | |

(Continued)

FOREIGN PATENT DOCUMENTS

DE 144701 11/1902
DE 2320125 10/1974

(Continued)

OTHER PUBLICATIONS

Moore, Statutory Invention Registration No. US H2139 H, "Active Heating System for Oil Pipeline", Jan. 3, 2006.

*Primary Examiner* — Lien Ngo
(74) *Attorney, Agent, or Firm* — Alan G. Towner, Esq.; Pietragallo Gordon Alfano Bosick & Raspanti, LLP

(57) ABSTRACT

A system for transferring and heating fluid is disclosed comprising a fluid transfer pipe having an internal surface and an external surface, and at least one helical heating rib connected to the internal surface of the fluid transfer pipe structured and arranged to generate non-laminar flow and to heat the fluid as it flows through the fluid transfer pipe. A method of heating fluid contained in a pipe is also disclosed. The method comprises providing at least one helical heating rib connected to an internal surface of a fluid transfer pipe, and passing the fluid through the fluid transfer pipe, whereby the at least one helical heating rib generates turbulent flow of the fluid to thereby heat the fluid. The helical heating ribs may comprise hollow channels through which a heating liquid may be passed to further heat the fluid contained in the pipe.

44 Claims, 6 Drawing Sheets

(56) References Cited

U.S. PATENT DOCUMENTS

| | | | |
|---|---|---|---|
| 3,828,847 A * | 8/1974 | Stein | 165/76 |
| 3,951,175 A * | 4/1976 | Eberhart | 138/178 |
| 3,976,129 A | 8/1976 | Silver | |
| 3,991,822 A * | 11/1976 | Morris | B21C 37/14 138/115 |
| 4,154,296 A | 5/1979 | Fijas | |
| 4,194,560 A * | 3/1980 | Matsuzaki | 165/141 |
| 4,265,310 A | 5/1981 | Britton et al. | |
| 4,321,908 A | 3/1982 | Reed | |
| 4,581,521 A | 4/1986 | Grise | |
| 4,798,241 A | 1/1989 | Jarrett et al. | |
| 4,895,203 A | 1/1990 | McLaren | |
| 5,077,103 A * | 12/1991 | Wagner et al. | 428/34.1 |
| 5,487,423 A | 1/1996 | Romero | |
| 5,655,599 A | 8/1997 | Kasprzyk | |
| 6,533,030 B2 | 3/2003 | Mitrovic et al. | |
| 6,571,863 B1 | 6/2003 | Liu | |
| 6,736,198 B2 | 5/2004 | Zhu et al. | |
| 6,920,919 B2 | 7/2005 | Wilson et al. | |
| H002139 H * | 1/2006 | Moore | 165/154 |
| 7,077,165 B2 | 7/2006 | Takasaki et al. | |
| 8,100,195 B2 | 1/2012 | Tao et al. | |
| RE43,650 E | 9/2012 | Caro et al. | |
| 2004/0040716 A1 | 3/2004 | Bursaux | |
| 2005/0150648 A1* | 7/2005 | Dilley et al. | 165/184 |
| 2008/0257436 A1 | 10/2008 | Caro et al. | |

FOREIGN PATENT DOCUMENTS

| | | | |
|---|---|---|---|
| DE | 2311688 A1 | 12/1974 | |
| DE | 3532979 C2 * | 3/1989 | 138/32 |
| DE | 202 11 331 U1 | 1/2004 | |
| EP | 0 323 734 A1 | 7/1989 | |
| JP | 2001341027 | 12/2001 | |
| JP | 2002228072 | 8/2002 | |
| WO | WO 92/19900 A1 * | 11/1992 | 138/178 |
| WO | 0102767 A1 | 1/2001 | |
| WO | 03/103540 A1 | 12/2003 | |
| WO | 2004/047908 A2 | 6/2004 | |
| WO | 2006032877 A1 | 3/2006 | |

* cited by examiner

INTERNALLY HEATED FLUID TRANSFER PIPES WITH INTERNAL HELICAL HEATING RIBS

CROSS-REFERENCE TO A RELATED APPLICATION

This application claims the benefit of U.S. Provisional Patent Application Ser. No. 61/588,468 filed Jan. 19, 2012, which is incorporated herein by reference.

FIELD OF THE INVENTION

The present invention relates to fluid transfer pipes, and more particularly relates to pipes having internal helical heating ribs that generate turbulent fluid flow in the pipes and are used to heat the fluid.

BACKGROUND INFORMATION

In industries such as oil and gas production, problems can occur when water and other liquids freeze inside pipelines. For example, hydraulic fracturing (fracking) is a process for extracting oil or natural gas in which large amounts of fracking fluid are pumped into the ground to create cracks in the rock that allow the oil or gas to flow to the well for extraction. Fracking water used in hydraulic fracturing operations is transported through pipelines located on or near the ground surface. Due to extreme climate changes that can occur at oil and gas drilling installations, water transfer can be compromised due to water freezing, which creates down time that becomes extremely costly.

Water can be stored on the surface in tanks or ponds, or pumped from streams. The water can be transferred over a relatively long distance to the well, where it is mixed with chemicals and pumped into the ground. During this operation, a relatively large amount of water flows through the pipes, so freezing of the water is unlikely. However, at other times the flow of water may be slow or non-existent. In cold climates, the water can freeze in the supply lines, preventing water flow or damaging the supply lines.

Attempts have been made to prevent such freezing, such as by bulk heating of the liquid contained in tanks, pits, ponds, reservoirs, etc. before the liquid is transported through a pipeline. In addition, external heating of pipelines has been proposed in an attempt to prevent freezing. However, such methods are inefficient and are often not effective in preventing pipeline freezing.

SUMMARY OF THE INVENTION

An aspect of the present invention is to provide a system for transferring and heating fluid comprising a fluid transfer pipe having an internal surface and an external surface, and at least one helical heating rib connected to the internal surface of the fluid transfer pipe structured and arranged to generate non-laminar flow and to heat the fluid as it flows through the fluid transfer pipe.

Another aspect of the present invention is to provide a fluid transfer pipe section comprising an internal surface and an external surface, and a helical heating rib connected to the internal surface of the pipe section, wherein the helical heating rib has a pitch ratio L:D of greater than 3:1, and a radial height H that is less than or equal to 15 percent of an inner diameter D of the fluid transfer pipe section.

A further aspect of the present invention is to provide a method of heating a fluid contained in a fluid transfer pipe, the method comprising providing at least one helical heating rib connected to an internal surface of the fluid transfer pipe, and passing the fluid through the fluid transfer pipe, whereby the at least one helical heating rib generates turbulent flow of the fluid to thereby heat the fluid.

These and other aspects of the present invention will be more apparent from the following description.

It is noted that certain features shown in the various figures are not drawn to scale in order to more clearly illustrate various aspects of the present invention.

DETAILED DESCRIPTION

The present invention provides pipes that heat a fluid as it passes through the pipe. Helical heating ribs in the form of solid or hollow tubes, channels or other structures are provided inside the pipes to induce non-laminar or turbulent flow of the fluid, which reduces or prevents freezing of process fluids, such as water-containing liquids, in the pipes. In one embodiment, a first pipe (also referred to as an outer pipe or host pipe) has an interior passage including a helical rib structure within the first pipe that is configured to cause a turbulent or helical flow of the process fluid, at least when the process fluid is flowing within a predetermined range of flow rates. The helical rib structure can include an internal channel for passage of a heating liquid. The heating liquid in the helical rib can be used to interiorly heat the pipe and the process fluid.

In one embodiment, the helical heating rib comprises at least one coiled heating tube positioned inside the pipe. The coiled heating tube can be used to transport a heating liquid that heats the pipe wall and can also provide heat to the process fluid. In certain embodiments, the coiled heating tube can have an internal channel having a substantially circular or non-circular cross-sectional shape.

A smooth inner wall having a circular cross-section would generally cause a laminar flow of a fluid in the pipe. However, the helical rib structure of the present invention creates a turbulent flow pattern, e.g., a helical or swirling flow of the process fluid. The turbulent flow generates frictional heating of the process fluid and can also reduce the pressure drop of the process fluid along the axial direction of the pipe. The helical or swirling flow can also have a higher velocity than a laminar flow in a pipe of comparable size. This higher velocity and/or turbulence caused by the helical structure can lower the probability of the process fluid freezing.

Figure 1:
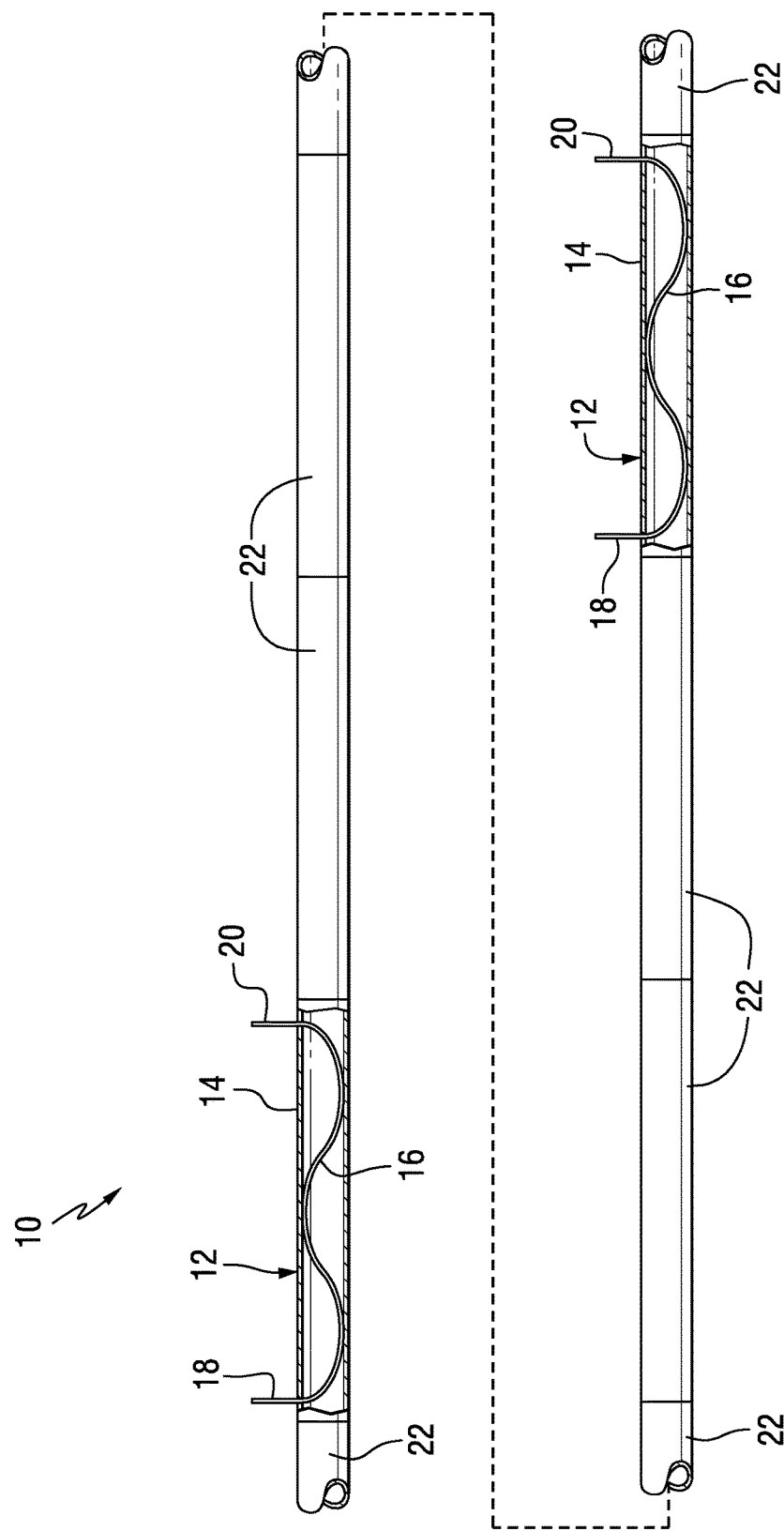
FIG. 1 is a partially schematic broken side view of an internally heated fluid transfer pipe in accordance with an embodiment of the present invention.

Referring to the drawings, FIG. 1 is a partially schematic side view of a heated pipeline 10 in accordance with an embodiment of the invention. The pipeline 10 includes at least one heated pipe section 12 having an outer pipe 14 and an internal helical heating rib in the form of a heating tube 16 therein. A single helical heating rib 16 is shown in the embodiment of FIG. 1. However, two or three helical heating ribs may possibly be used in each heated pipe section 12. The heating tube 16 includes an inlet 18 and an outlet 20 forming passageways extending radially through the sidewall of the pipe 14. In addition to the heated pipe section(s) 12, the pipeline 10 may also include standard or non-heated pipe sections 22. In certain embodiments, the heated pipe sections 12 may comprise less than 50 percent, or less than 25 percent, of the overall length of the pipeline 10. The pipeline 10 may be used in many different applications, including transportation of fracking water and other liquids in the oil and gas industry, as well as for the transportation of fluids in many other industries.

Figure 2:
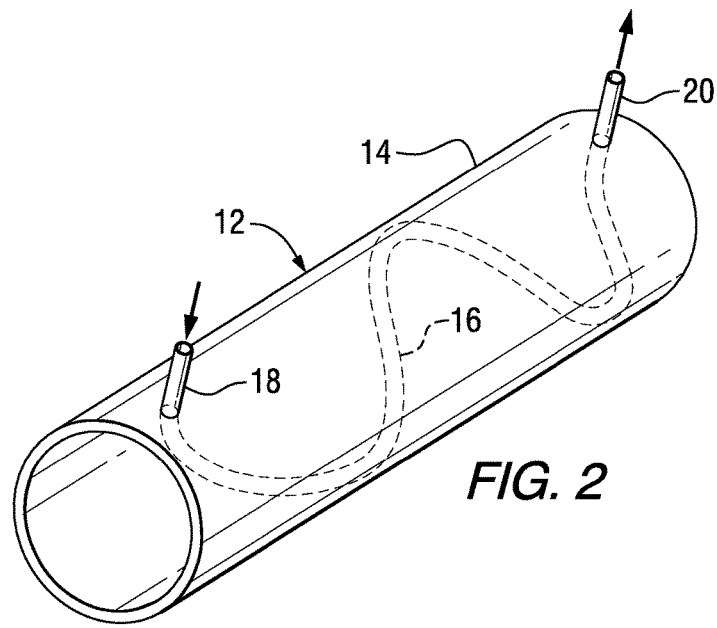
FIG. 2 is a partially schematic isometric view of an internally heated fluid transfer pipe in accordance with an embodiment of the present invention.

FIG. 2 is a partially schematic isometric view of a heated pipe section 12 in accordance with an embodiment of the present invention. The heated pipe section includes an outer pipe 14 having the shape of a right circular cylinder which serves as a fluid transfer pipe, and a helical heating rib in the form of an internal heating tube 16 is connected to an internal surface of the pipe 14 in a helical pattern. The internal heating tube 16 communicates with the inlet 18 and the outlet 20, which extend radially through the sidewall of the outer pipe 14. Liquid may pass through the inlet 18 of the internal heating tube 16 to the outlet 20, as shown by the arrows in FIG. 2. In the embodiment shown, both the inlet 18 and outlet 20 pass radially through the sidewall of the outer pipe 14 near opposite ends of the pipe. However, any other suitable configuration may be used, e.g., one or both of the inlet 18 and outlet 20 may be moved to any other desired location along the length of the outer tube 14. Furthermore, the inlet 18 and/or outlet 20 may extend radially between the exterior and interior of the outer pipe 14 at or adjacent to the ends of the pipe, e.g., by passing radially through a coupling or sleeve connected to one or both ends of the outer pipe 14. In such configurations, the inlet and outlet are considered to extend radially through the sidewall of the fluid transfer pipe.

Figure 3:
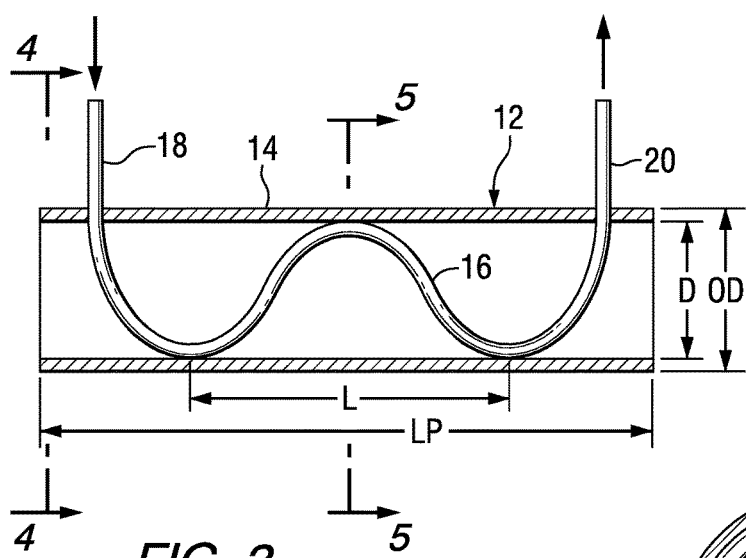
FIG. 3 is a partially schematic sectional side view of an internally heated fluid transfer pipe in accordance with an embodiment of the present invention.

FIG. 3 is a partially schematic longitudinal sectional view of the heated pipe section 12 containing the internal heating tube 16. The heated pipe section 12 can have a length LP of any desired dimension, for example, from 1 foot or less to 10,000 feet or more. For many applications, pipe sections of from 10 to 100 feet may be desirable. As shown in FIG. 3, the outer pipe 14 of heated pipe section 12 has an outer diameter OD and an inner diameter D having any desired dimensions. For example, the OD and D may each range from 1 inch or less to 10 feet or more. The wall thickness of the outer pipe 14 may be selected as desired, for example, from 0.01 inch or less to 1 foot or more. In certain embodiments, the length LP of the heated pipe section 12 may be from 1 to 100 feet, the outer diameter OD may be from 1 inch to 10 feet, the inner diameter D may be from 1 inch to 10 feet, and the wall thickness may be from 0.05 to 10 inches.

As shown in FIG. 3, the internal helical heating rib, such as the heating tube 16, has a helical shape in which each 360° turn of the helix corresponds to a length L measured in a direction parallel to the axis of the helix. The helix has a pitch ratio L:D corresponding to the length L divided by the inner diameter D of the outer pipe 14. The pitch ratio of L:D may be greater than 1:1, or greater than 2:1, or greater than 3:1. In certain embodiments, the pitch ratio may be from 4:1 to 20:1, for example, from 5:1 to 10:1. The pitch ratio L:D typically remains constant along the length LP of the heated pipe section, but it could be varied in certain embodiments. In certain embodiments, for an outer pipe having an inner diameter D of about 12 inches, the length L may range from 3 feet to 50 feet, typically from 4 feet to 20 feet, for example, from 5 feet to 7 feet. The pitch ratio may be optimized to account for the viscosity, density and velocity of the process fluid to be transported by the pipe.

Figure 4:
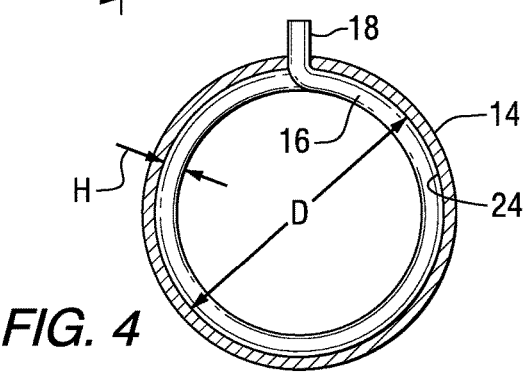
FIG. 4 is a cross-sectional end view of the internally heated fluid transfer pipe of FIG. 3 taken along line 4-4.

FIG. 4 is a cross-sectional view of the heated pipe section 12 of FIG. 3, taken along line 4-4. The internal heating tube 16 is connected to an inner surface 24 of the outer pipe 14, and includes an inlet end 18 extending through the sidewall of the outer pipe 14. As shown in FIGS. 2 and 3, the internal heating tube 16 also includes an outlet end 20 extending through the sidewall of the outer pipe 14.

Figure 5:
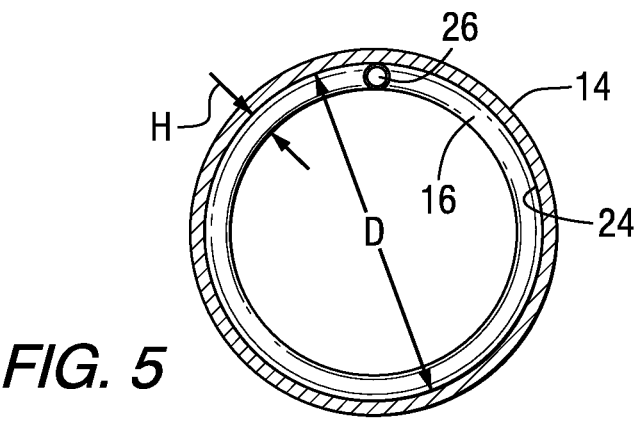
FIG. 5 is a cross-sectional end view of the internally heated fluid transfer pipe of FIG. 3 taken along line 5-5.

FIG. 5 is a cross-sectional view of the pipe section 12 of FIG. 3 taken along line 5-5. In this view, the heating tube 16 is shown to have a circular cross-sectional shape. In this embodiment, the heating tube is connected to the internal surface 24 of the outer pipe 14 to attach the components together, and to prevent the flow of process fluid between the heating tube 16 and the internal surface 24 of the outer pipe 14. This connection can be made, for example, by bonding or fusing the heating tube to the internal surface of the pipe, using for example, adhesive, welding, or any other suitable method that permanently bonds the internal surface of the pipe and the heating tube together. The bonding method may vary depending on wall thickness, pipe size, pressure requirements, and the type of fluid to be transported. In the embodiment shown, the heating tube 16 has an internal channel 26 for passage of the heating liquid. In this embodiment, the channel has a circular cross-sectional shape. However, the channel can have other cross-sectional shapes. The outer diameter and pitch of the heating tube 16 can be selected to produce the desired helical flow of the process fluid.

As shown in FIGS. 4 and 5, the internal helical heating rib, in the form of the tube 16, has a height H measured radially from the inner surface 24 of the outer pipe 14. The rib height H may be in a range of from 0.1 inch to 10 inches or more, depending upon the dimensions of the pipe sections in which they are installed. For example, the height H may range from 1 to 15 percent of the inner diameter D of the outer pipe 14. In certain embodiments, the height H may range from 5 to 14 percent of the inner diameter D of the outer pipe 14, for example, from 6 to 12 percent.

By providing the internal helical heating rib structure, such as the helical arrangements shown in FIGS. 1-5, the ribs cause a non-laminar or turbulent flow of the process fluid, e.g., a helical or swirling pattern, as it is transported through the heated pipe section 12. Such a turbulent flow generates heat within the process fluid, e.g., by frictional heating, and may provide increased heat transfer between the heating liquid and the process fluid.

In accordance with embodiments of the invention, the internal heating tube 16 is connected to the internal surface of the outer pipe 14, e.g., by welding or adhesive, to secure the heating tube to the internal surface of the outer pipe. Alternatively, the outer pipe 14 and internal heating tube 16 may be integrally formed, e.g., by co-extrusion. In certain embodiments, the internal heating tube 16, or other type of helical heating rib, is permanently bonded, welded, adhered, integrally formed or otherwise attached to the internal surface of the outer pipe, as opposed to being removable.

The outer pipe 14 and internal heating tube 16 can be constructed of materials that are selected based on the characteristics of the fluid to be transported and the expected operating parameters of the fluid transport system. For example, the outer pipe 14 and internal heating tube 16 may be made of polymeric materials such as thermosets, thermoplastics, polyethylene, polypropylene, and the like, or metals such as iron, steel, and the like. The material used for the host pipe and the inner coil may be the same or different, e.g., a polymer such as polyethylene, polyurethane, or the like. In certain embodiments, the outer pipe 14 may be made of a material having a relatively low thermal conductivity and high thermal insulation in order to provide a degree of thermal insulation that helps retain heat within the outer pipe 14. For example, the outer pipe 14 may be made of a polymer such as polyethylene or the like having a thermal conductivity k of less than 0.5, wherein k represents cal/cm·sec·K for a material at a temperature of 300K. In certain embodiments, the thermal conductivity k may be less than 0.4, or less than 0.2, or less than 0.1. The internal heating tube 16 may have the same or different thermal conductivity as the outer pipe 14. In certain embodiments, the internal heating tube 16 and outer pipe 14 may have the same or similar coefficients of thermal expansion.

Table 1 shows several examples of pipes that can be used for the outer pipe 14 and the internal helical tube 16. In each example, the helical tube 16 has a pitch ratio of about 6:1, that is, there is one turn of the helix for every six feet measured along the central axis of the host pipe.

TABLE 1

| | OD (inch) | D (inch) | Min. Wall Thickness (inch) | Operating Pressure (psi) |
|---|---|---|---|---|
| Outer Pipe | | | | |
| 12" SDR 11 | 12.75 | 10.29 | 1.159 | 160 |
| 12" SDR 13.5 | 12.75 | 10.74 | 0.994 | 125 |
| 12" SDR 17 | 12.75 | 11.16 | 0.750 | 100 |
| Helical Heating Tube | | | | |
| 1.25" SDR 11 | 1.66 | 1.358 | 0.151 | 160 |
| 1.25" SDR 13.5 | 1.66 | 1.414 | 0.123 | 125 |
| 1.25" SDR 17 | 1.66 | 1.464 | 0.098 | 100 |

Figure 6:
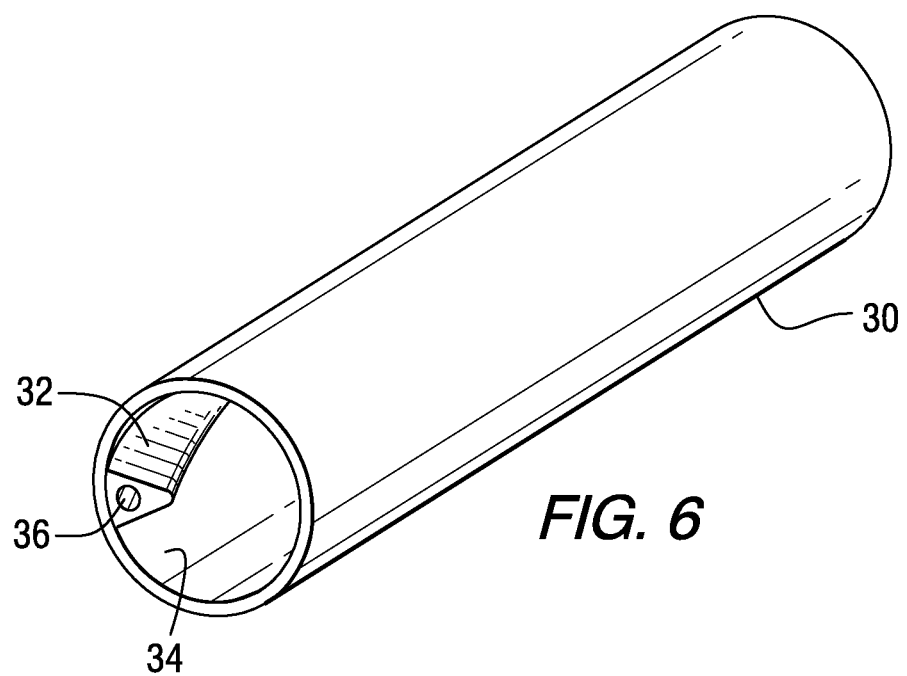
FIG. 6 is a partially schematic isometric view of an internally heated fluid transfer pipe in accordance with another embodiment of the present invention.
Figure 7:
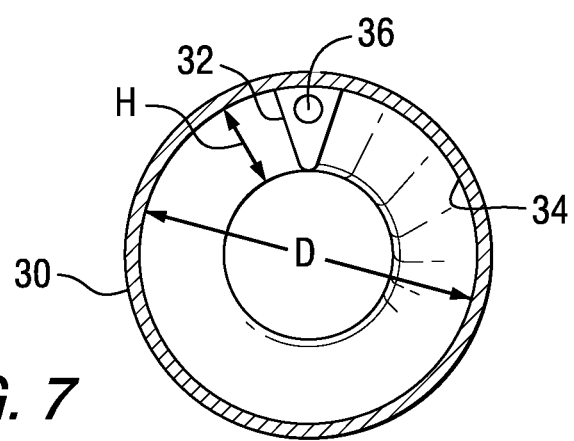
FIG. 7 is a cross-sectional end view of the internally heated fluid transfer pipe of FIG. 6.

FIG. 6 is a partially schematic isometric view of a heated pipe in accordance with another embodiment of the present invention. FIG. 7 is a cross-sectional view of the pipe of FIG. 6. In this embodiment, an outer pipe 30 contains an internal helical heating rib 32 that comprises a protrusion from the internal surface 34 of the outer pipe. The portion of the internal helical heating rib 32 contacting the internal surface 34 of the outer pipe 30 may have substantially the same cross-sectional radius of curvature as the internal surface 34 in order to maximize the surface contact area therebetween. The helical rib 32 has a channel 36 for passage of the heating liquid. In this embodiment, the channel has a circular cross-sectional shape. However, the channel can have other cross-sectional shapes. The height H and pitch ratio L:D of the helical rib 32 can be selected as described above to produce the desired turbulent flow of the process fluid. It is recognized that the optimal height H may depend on the expected flow rate, or range of flow rates, of the process fluid, as well as the characteristics of the process fluid.

Figure 8:
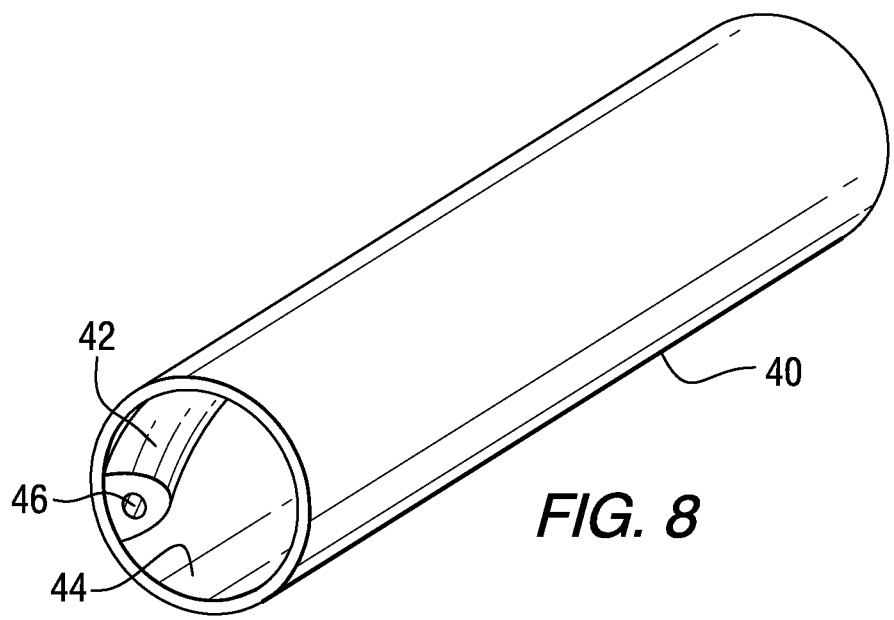
FIG. 8 is a partially schematic isometric view of an internally heated fluid transfer pipe in accordance with another embodiment of the present invention.
Figure 9:
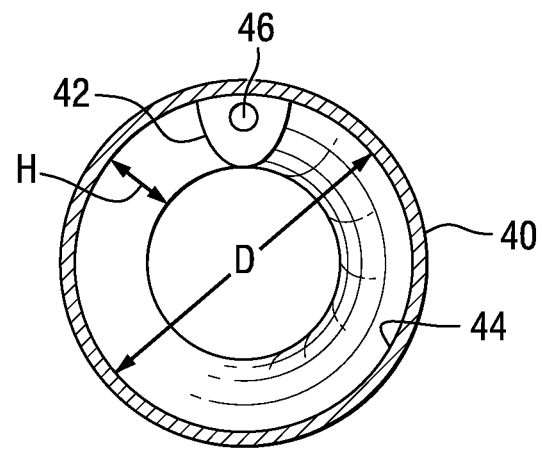
FIG. 9 is a cross-sectional end view of the internally heated fluid transfer pipe of FIG. 8.

FIG. 8 is a partially schematic isometric view of a heated pipe in accordance with another embodiment of the present invention. FIG. 9 is a cross-sectional view of the pipe of FIG. 8. In this embodiment, an outer pipe 40 encloses an internal helical heating rib 42 that comprises a protrusion provided on the internal surface 44 of the pipe. The portion of the internal helical heating rib 42 contacting the internal surface 44 of the outer pipe 40 may have substantially the same cross-sectional radius of curvature as the internal surface 44 in order to maximize the surface contact area therebetween. The helical rib 42 has a channel 46 for passage of the heating fluid. In this embodiment, the channel has a circular cross-sectional shape. However, the channel can have other cross-sectional shapes. The height H and pitch ratio L:D of the helical rib 42 can be selected as described above to produce the desired turbulent flow of the process fluid.

The outer pipes 30 and 40, and the internal helical heating ribs 32 and 42, in the embodiments shown in FIGS. 6-9 may be made of similar types of materials having similar characteristics as the embodiments of FIGS. 2-4.

The heating liquid contained in and transported through the internal channels of the helical ribs may be any suitable liquid such as water, hydraulic fluid, antifreeze and the like. The rate of flow of the heating liquid through the internal helical structure may be adjusted to achieve the desired heat transfer, e.g., at a rate sufficient to prevent freezing of the process fluid that is held and/or transported through the heated pipe sections 12, as well as any additional non-heated pipe sections 20. The temperature of the heating liquid passing through the helical channel is typically above 0° C., for example, above 10 or 20° C. In certain embodiments, the heating fluid may have a temperature of greater than 50° C., 100° C., 200° C., or higher.

Figure 10:
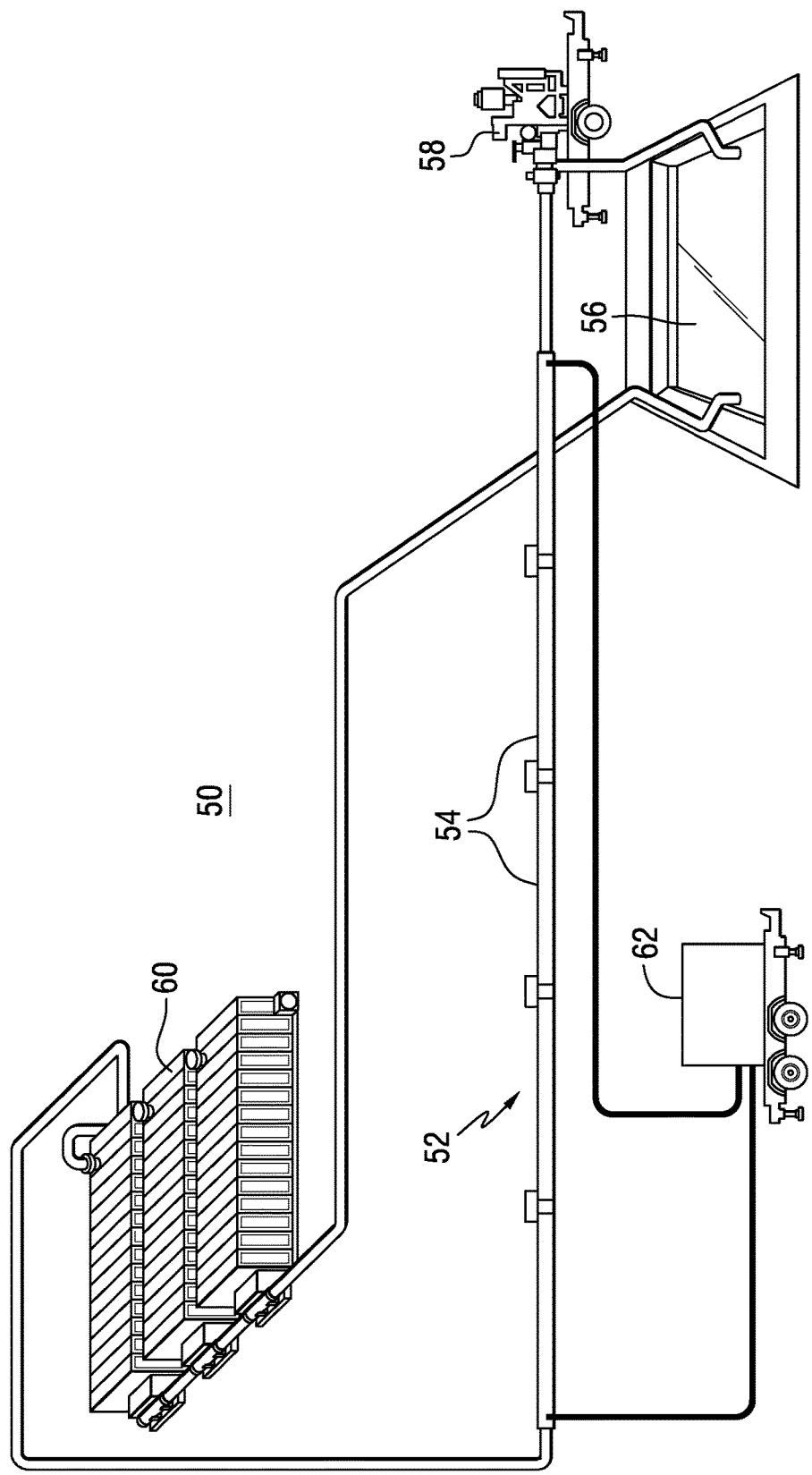
FIG. 10 is a schematic representation of portions of a hydraulic fracturing gas operation including an internally heated fluid transfer pipe in accordance with an embodiment of the present invention.

FIG. 10 is a schematic representation of portions of a hydraulic fracturing or fracking gas operation 50 including a heated pipeline 52 including sections of heated pipe 54 in accordance with an embodiment of the present invention. FIG. 10 shows a source of fracking fluid in the form of a pond 56. A pump 58 extracts water from the pond and pumps it into a pipeline 52. The pipeline includes one or more heated pipe sections 54. The pipeline delivers the water to fracking tanks 60. After the water is used in the fracking operation, at least a portion of the water may be returned to the pond or otherwise handled. The heated pipeline 52 may comprise an open or discontinuous system in which the process fluid does not flow in a continuous closed loop, i.e., some or all of the process fluid flowing through the heated pipeline 52 may not be recirculated through the pipeline. During various aspect of the fracking operation, the water may flow at a high rate through the internally heated pipe 54, of for example, greater than 100 gallons per minute, often greater than 200, 300 or 400 gallons per minute. At other times, the water may flow at a low rate, or it may be stagnant. During these times, if the pipeline is exposed to a low ambient temperature, the water in the pipeline can freeze. To prevent freezing, a boiler 62 is provided to heat the heating liquid that is passed through the internal helical structure in the heated pipe sections.

In certain embodiments, the heated pipes are provided in 30 to 500 ft sections, e.g., 40 ft sections. The pipes may be fused together to the desired length and the heated sections may be placed approximately every 100 to 200 feet apart, e.g., 120 feet apart. Another area where the internal helical structure can be used is the manifold. Freezing may result from lack of movement of the process fluid or low flow during fracking. A heating tube can also be placed in the manifold as well as the pipe sections.

Figure 11:
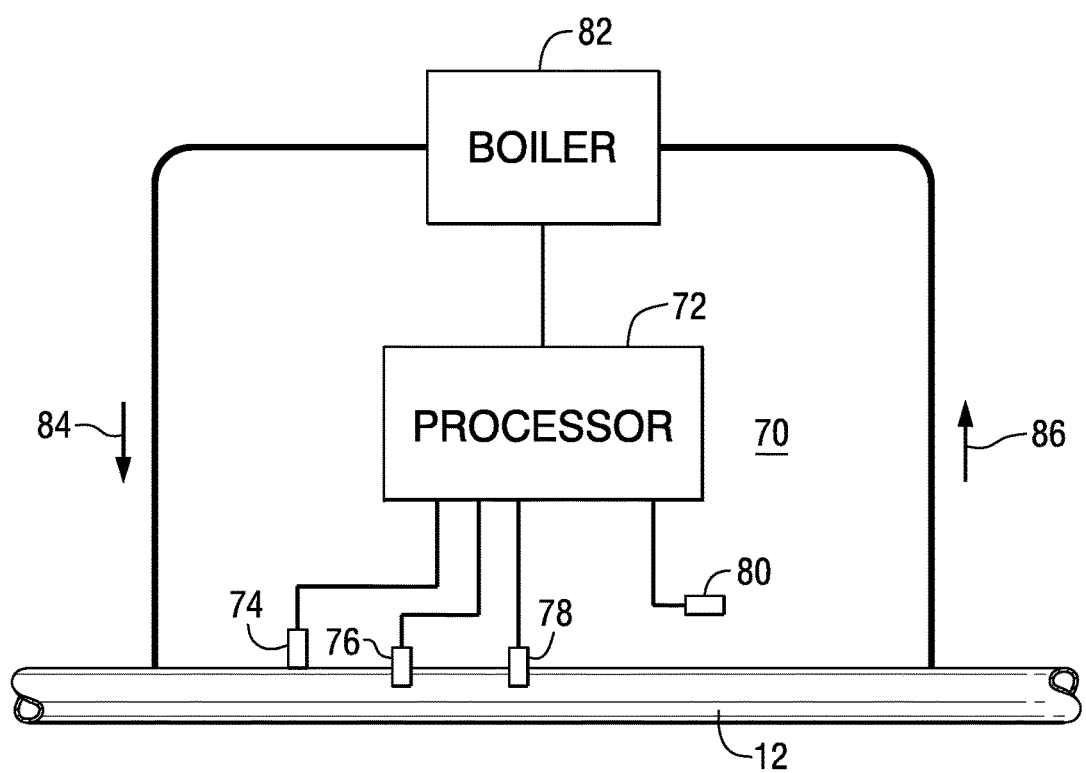
FIG. 11 is schematic view of portions of a control system that can be used in combination with an internally heated fluid transfer pipe in accordance with an embodiment of the present invention.

FIG. 11 is schematic block diagram of portions of a control system 70 that can be used in combination with a heated pipe 12 in accordance with an embodiment of the present invention. The control system includes a computer or other signal processing device 72 that receives signals from various sensors 74, 76, 78, 80 that provide signals representative of various parameters such as ambient temperature, process fluid temperature, process fluid flow rate, process fluid pressure, heating liquid temperature, heating liquid flow rate, heating fluid pressure, outer pipe temperature, inner pipe temperature, etc. The processing device can then be used to control the operation of the boiler 82 to provide heating fluid at a desired temperature and/or flow rate.

The turbulent or helical flow produced by the internal helical structure provides numerous advantages. For example, the heat transfer between the pipe wall and the process fluid is improved. Turbulent or helical flow reduces the probability of precipitate accumulation on the internal surface of the pipe, and may also promote mixing of the process fluid. In addition, pressure losses and energy losses can be reduced. Furthermore, the velocity profile of the flow across the pipe may be more uniform than with laminar flow in a conventional pipe, which can allow the process fluid to clean the pipe.

In various applications, the pipes described herein can be used for the transportation of various fluids, such as fracking water, potable water, waste water, sewage, slurries, powders, food or beverage products, or any single phase or multiphase fluids. The use of an internal heating fluid channel inside of the pipe and/or manifolds provides a cost-effective approach. The apparatus and methods of the present invention have applications inside and outside of the oil and gas industry where freezing is a problem.

Whereas particular embodiments of this invention have been described above for purposes of illustration, it will be evident to those skilled in the art that numerous variations of the details of the present invention may be made without departing from the invention.

What is claimed is:

1. A system for transferring and heating fluid comprising:
a fluid transfer pipe having an internal surface and an external surface; and
at least one helical heating rib co-extruded and integrally formed with the internal surface of the fluid transfer pipe structured and arranged to generate non-laminar flow and to heat the fluid as it flows through the fluid transfer pipe, wherein the at least one helical heating rib has a pitch ratio L:D of greater than 2:1, the at least one helical heating rib does not extend along the entire length of the fluid transfer pipe, the at least one helical heating rib is located in at least one heated section of the fluid transfer pipe, and the at least one heated section has a section length that is less than 50 percent of an overall length of the fluid transfer pipe.

2. The system of claim 1, wherein the at least one helical heating rib prevents freezing of the fluid.

3. The system of claim 2, wherein the fluid comprises water.

4. The system of claim 2, wherein the fluid comprises fracking water.

5. The system of claim 1, wherein the heated section length is less than 25 percent of the overall length of the pipe.

6. The system of claim 1, wherein a single one of the helical heating ribs is connected to the internal surface of the fluid transfer pipe.

7. The system of claim 1, wherein less than four of the helical heating ribs are connected to the internal surface of the fluid transfer pipe.

8. The system of claim 1, wherein the at least one helical heating rib has a radial height H that is less than or equal to 15 percent of an inner diameter D of the fluid transfer pipe.

9. The system of claim 8, wherein the radial height H is from 5 to 14 percent of the inner diameter D.

10. The system of claim 1, wherein the pitch ratio L:D is from 3:1 to 10:1.

11. The system of claim 1, wherein the pitch ratio L:D is from 4:1 to 8:1.

12. The system of claim 1, wherein the at least one helical heating rib has a constant pitch ratio.

13. The system of claim 1, wherein the at least one helical heating rib has a varied pitch ratio.

14. The system of claim 1, wherein the at least one helical heating rib generates turbulent flow of the fluid to thereby heat the fluid by frictional contact within the fluid.

15. The system of claim 1, wherein the at least one helical heating rib comprises an internal channel structured and arranged to transfer a heating liquid therethrough.

16. The system of claim 15, wherein the at least one helical heating rib comprises an inlet end extending radially through a sidewall of the fluid transfer pipe, and an outlet end extending radially through the sidewall of the fluid transfer pipe.

17. The system of claim 1, wherein the at least one helical heating rib comprises an internal channel containing a heating liquid.

18. The system of claim 17, wherein the heating liquid is in fluid flow communication with an inlet passageway and an outlet passageway, and at least one of the inlet and outlet passageways extend radially through a sidewall of the fluid transfer pipe.

19. The system of claim 18, wherein both of the inlet and outlet passageways extend radially through the sidewall of the fluid transfer pipe.

20. The system of claim 17, wherein the heating liquid comprises water, hydraulic fluid and/or antifreeze.

21. The system of claim 17, wherein the heating liquid has a temperature of from 20° C. to 200° C.

22. The system of claim 1, wherein the at least one helical heating rib comprises a non-circular cross section.

23. The system of claim 1, wherein the fluid transfer pipe and the at least one helical heating rib are made of rigid nondeformable materials.

24. The system of claim 1, wherein the fluid transfer pipe is made of a material having a thermal conductivity k of less than 0.5.

25. The system of claim 1, wherein the at least one helical heating rib is made of a material having a thermal conductivity k of less than 0.5.

26. The system of claim 1, wherein the fluid transfer pipe is made of a polymer.

27. The system of claim 26, wherein the polymer comprises polyethylene.

28. The system of claim 1, wherein the at least one helical heating rib is made of a polymer.

29. The system of claim 28, wherein the polymer comprises polyethylene.

30. The system of claim 1, wherein the fluid transfer pipe and the at least one helical heating rib are made of polymers having substantially the same coefficients of thermal expansion.

31. The system of claim 1, wherein the fluid transfer pipe and at least one helical heating rib are made of different materials.

32. The system of claim 31, wherein the different materials are different types of polyethylene.

33. The system of claim 1, wherein the fluid transfer pipe is substantially straight.

34. The system of claim 33, wherein the fluid transfer pipe is cylindrical and has a substantially uniform inner diameter along its length and around its circumference.

35. A fluid transfer pipe section made of a polymer comprising an internal surface and an external surface, and a helical heating rib co-extruded and integrally formed with the internal surface of the pipe section, wherein the helical heating rib has a pitch ratio L:D of greater than 3:1, and a radial height H that is less than or equal to 15 percent of an inner diameter D of the pipe section.

36. The fluid transfer pipe section of claim 35, wherein the helical heating rib comprises an internal channel.

37. The fluid transfer pipe section of claim 36, wherein the internal channel is in fluid flow communication with an inlet passageway and an outlet passageway, and at least one of the inlet and outlet passageways extend radially through a sidewall of the fluid transfer pipe.

38. A method of heating liquid water contained in a fluid transfer pipe, the method comprising:
   providing at least one helical heating rib co-extruded and integrally formed with an internal surface of the fluid transfer pipe, wherein the at least one helical heating rib has a pitch ratio L:D of greater than 2:1; and
   passing the water through the fluid transfer pipe, whereby the at least one helical heating rib generates turbulent flow of the water to thereby heat the water.

39. The method of claim 38, further comprising passing a heating liquid through an internal channel in the at least one helical heating rib to thereby heat the water.

40. The method of claim 39, wherein the heating liquid is passed radially through a sidewall of the fluid transfer pipe.

41. The method of claim 38, wherein the water is passed through the fluid transfer pipe at varying flow rates.

42. The method of claim 41, wherein the flow rates range from zero gallons per minute to greater than 100 gallons per minute during the heating method.

43. The method of claim 38, wherein the water is passed through the fluid transfer pipe at a flow rate of greater than 200 gallons per minute.

44. The method of claim 38, wherein the fluid transfer pipe is made of a polymer.

* * * * *